June 27, 1967 V. C. SHANEMAN 3,328,667
DC-AC INVERTER WITH PROTECTIVE SATURATING REACTORS
Filed Jan. 31, 1964 2 Sheets-Sheet 1

WITNESSES
Theodore F. Wrobel
James F. Young

INVENTOR
Victor C. Shaneman
BY
Clement
ATTORNEY

United States Patent Office 3,328,667
Patented June 27, 1967

3,328,667
DC-AC INVERTER WITH PROTECTIVE SATURATING REACTORS
Victor C. Shaneman, Shawnee Township, Ohio, assignor to Westinghouse Electric Corporation, Pittsburgh, Pa., a corporation of Pennsylvania
Filed Jan. 31, 1964, Ser. No. 341,521
20 Claims. (Cl. 321—45)

This invention relates to DC-AC inverters employing controlled electric valves and forced commutation or turn-off by commutating capacitor.

A capacitor commutated inverter presents a short circuit across the DC input during the interval between turn-on of one valve and turn-off of the other valve. To limit current transients during the commutation period, inductive reactance is inserted in the load current path. The reactor and capacitor in this type of circuit give rise to certain undesirable conditions and problems some of which are compounded by inductive loads.

For example, each valve is subjected to high reverse voltages during its "non-conduction" period and to voltage spikes in the forward direction during the forepart of the interval that the valve is required to block the applied DC voltage.

Figure 1:
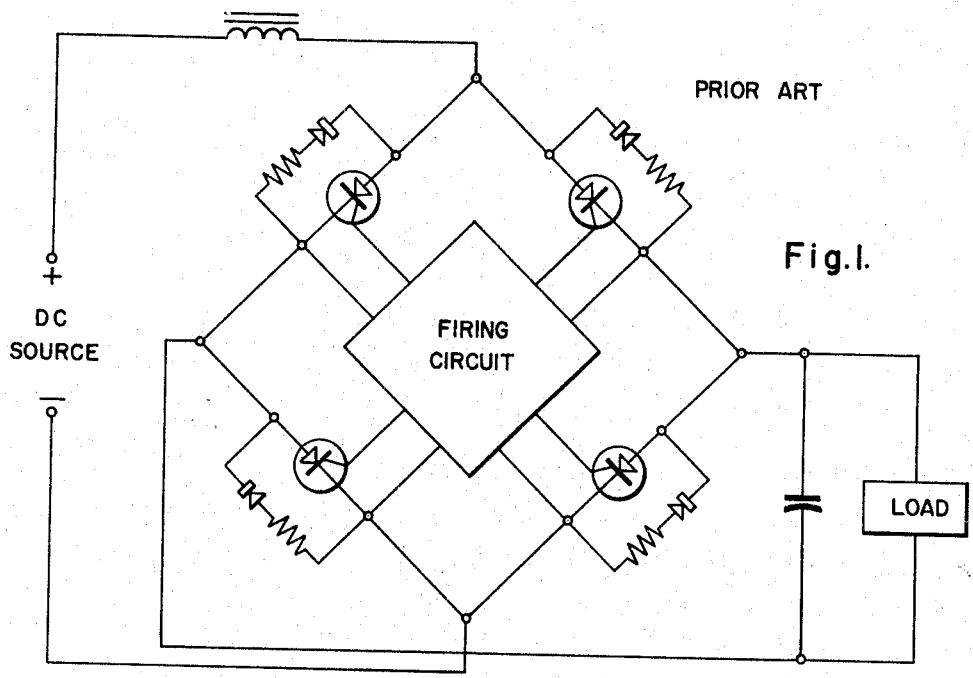

In the prior art circuit of FIG. 1, a shunt path including a semiconductor diode and a series resistor is connected across each valve to reduce the reverse voltage thereacross. The difficulty with this circuit is that the diode is subject to breakdown upon sudden voltage reversal after forward conduction through the diode. This is due to the fact that the voltage reversal hits the diode before it has a chance to reform or recombine carriers. The resistors in series with the diodes also make the circuit more sensitive to variations in load magnitude and power factor. Also, the circuit of FIG. 1 is subject to large current spikes which seriously reduce the amount of power that can be transmitted to the load. This is due to the low impedance path through which the commutating capacitor can discharge, and which includes two parallel paths; one, the reverse direction of the "non-conducting" valve during its reformation or sweep-out period; the other the resistor-diode shunt in the forward direction of the diode.

The present invention is directed to inverted circuits wherein the above disadvantages are substantially eliminated.

The above disadvantages are substantially eliminated in an inverter made in accordance with one embodiment of the invention wherein a capacitor-commutated inverter with controlled valves is provided with a saturable reactor in series with each valve and a saturable reactor in series with a reversely poled diode in a shunt circuit connected across each valve.

It is therefore an object of the present invention to provide a new and improved DC-AC inverter.

Another object is to provide a novel capacitor-commutated inverter in which the controlled valves and their shunting reversely poled diodes are not exposed to excessive voltages and currents which might damage or degrade the elements.

Another object is to provide an improved circuit for dissipating reactive energy from the reactive components in the circuit.

A further object is to provide an inverter with a discharge path for the commutating capacitor wherein the maximum capacitor discharge current is reduced.

Figure 2:
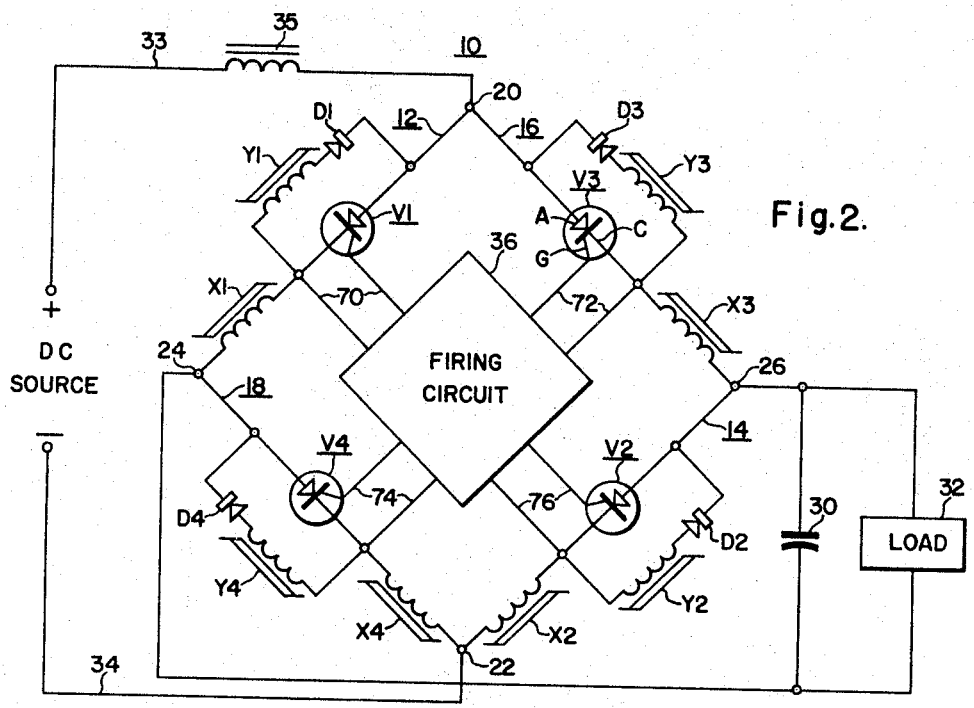
Figure 4:
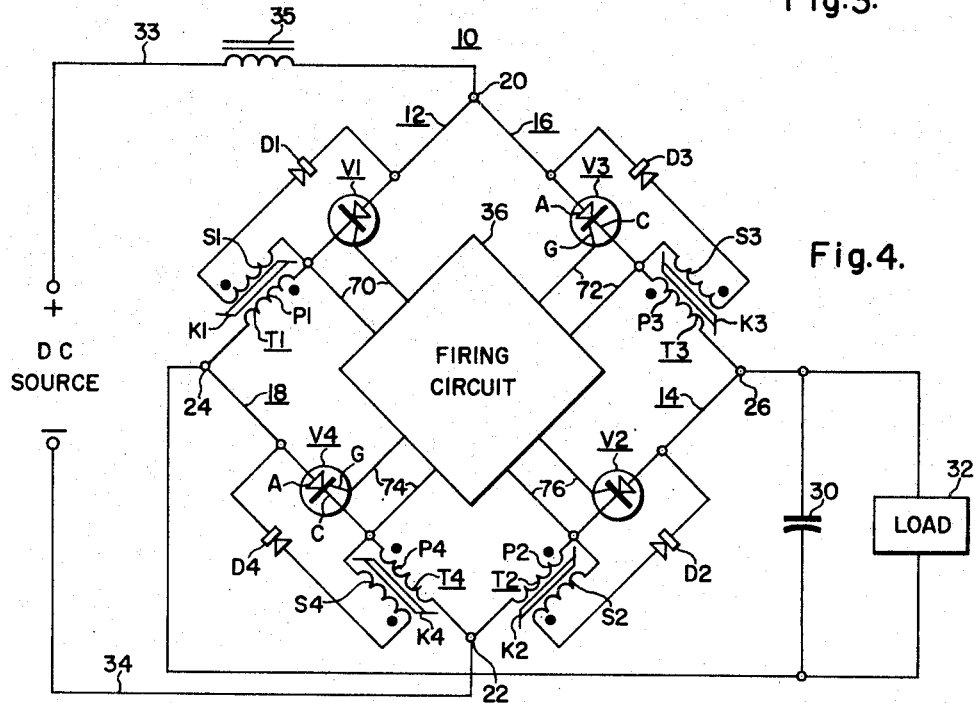

Other and further objects and advantages of the present invention will become apparent from the following detailed description taken in connection with the drawings wherein FIGS. 2 and 4 illustrate embodiments of the invention.

Figure 3:
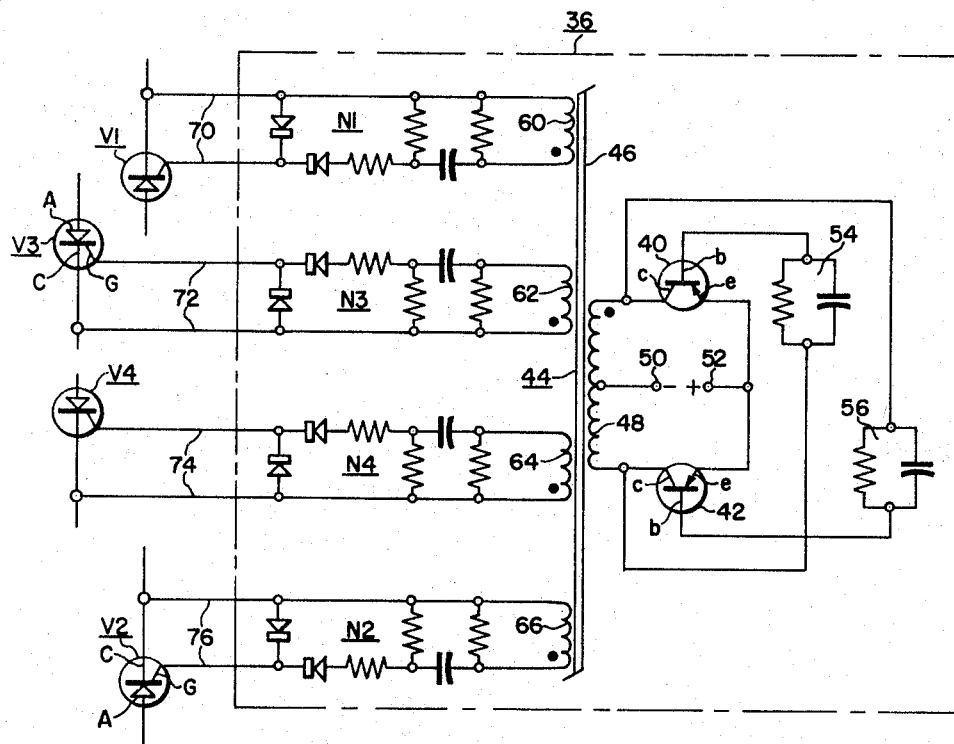

In the drawings:
FIGURE 1 is a schematic diagram of a conventional bridge type parallel inverter known in the prior art;
FIG. 2 is schematic diagram of a bridge type parallel inverter embodying features of the invention;
FIG. 3 is a diagram of the firing circuit of FIG. 2; and
FIG. 4 is a schematic diagram of another embodiment of the invention.

The bridge type parallel inverter in FIG. 1 includes two pairs of semiconductor controlled valves, the valves of one pair being disposed in opposite legs of the bridge, while the valves of the other pair are connected in the other two legs. A firing circiut is arranged to fire the valve pairs in sequence, periodically alternating from one pair to the other. Each of the valves is shunted by an oppositely poled semiconductor diode in series with a resistor. The circuit also includes an inductive reactor in the load current path and a commutating capacitor.

Since the operation of the circuit in FIG. 1 is well known, an explanation is not required. Its shortcomings have been pointed out hereinbefore.

Referring now to FIG. 2, the inverter shown therein includes four legs 12, 14, 16 and 18, interconnected to form a bridge having DC terminals 20 and 22 across one diagonal thereof, and AC output terminals 24 and 26 across the other diagonal thereof. Each leg of the bridge includes a controlled electric valve V in series with a saturable reactor X. Each leg further includes a shunt circuit around the valve V including an oppositely poled asymmetric device D, for example a solid state diode, in series with a second saturable reactor Y. Reactors X and Y are provided with cores made of square loop magnetic material. The valves in legs 12, 14, 16 and 18 are indicated at V1, V2, V3 and V4 respectively. The reference character identifying each component in a bridge leg carries the same numerical suffix as the valve V in that leg.

A commutating capacitor 30 is connected across the AC output terminals 24 and 26, which are connected to a load 32 for example an induction motor. DC terminals 20 and 22 are connected to positive and pegative input lines 33 and 34, respectively, of the inverter 10, there being an inductive reactor 35, preferably non-saturating, connected between terminal 20 and the input line 33 to reduce transient current changes especially during commutation. The DC input lines 33 and 34 of the inverter are connected to a suitable source of DC power.

Each of the valves V is provided with power current inlet and power current outlet electrode A and C, respectively and a control electrode G. The control input circuit of a controlled valve V includes the control electrode and one of the power current electrodes, while the power or main current path of the valve extends from the power current inlet electrode to the power current outlet electrode.

The valves V normally block current flow in both the forward and reverse directions, however, in response to the application of a control signal of appropriate magnitude and polarity to the control electrode of the valve while the valve is voltage biased in a particular direction, the valve is rendered highly conductive (fired) in the latter direction, generally referred to as the forward direction. Conduction continues until the power current through the valve falls below a predetermined minimum, holding value. Turn-off is accomplished by applying a sufficient reverse voltage across the valve. The circuit is especially effective with and protective of solid state controlled valves, for example the silicon controlled rectifiers shown at V. The respective inlet, outlet and control electrodes of a silicon controlled rectifier are usually referred to as the anode, cathode and gate electrodes respectively. In silicon controlled rectifiers, the control circuit usually includes the gate and cathode electrodes.

With specific regard to silicon controlled rectifiers, forward voltage is applied to them when the anode is made positive relative to the cathode. With the appropriate positive voltage on the anode A, the controlled valve V will be fired (rendered conductive) when the gate electrode G has applied thereto a voltage of appropriate polarity and magnitude to forward bias the gate junction. In the specific example disclosed, the valves V will fire when a positive signal is applied to the gate electrode G relative to the cathode C while the valve is forward biased, that is, with positive voltage on the anode A relative to the cathode C.

A firing or gating circuit 36 is arranged to sequentially fire (gate) the valve pairs V1–V2 and V3–V4, periodically alternating from one valve pair to the other. Thus valves V1 and V2 located in opposite branches 12 and 14 are fired together during one interval, and valves V3 and V4 located in opposite branches 16 and 18 are fired together during the succeeding interval, and so on. Although any suitable firing circuit may be employed, a detailed example of firing circuit 36 is shown in FIG. 3.

The inverter may be looked at as two alternately conductive main current paths that couple the DC source to the load and perform the function of a periodic reversing switch. In the example, one path is from line 33 through reactor 35, terminal 20, leg 16, output terminal 26, load 32 (in one direction), terminal 24, leg 18, terminal 22, to line 34. The other path leads from line 33, reactor 35, terminal 20, leg 12, terminal 24, load 32 (in opposite direction), terminal 26, leg 14, terminal 22, to line 34.

Referring now to FIG. 3, the firing circuit 36 is shown as an oscillator having four isolated outputs connected to the control circuits of the respective valves. The oscillator 36 includes transistors 40 and 42 and a transformer 44 having a saturable core of substantially square loop ferromagnetic material 46. The transformer 44 is provided with a primary winding 48, having end terminals connected to the collectors C of transistors 40 and 42, and a center tap which is connected to the negative terminal 50 of a DC power source. The emitters E of transistors 40 and 42 are connected to the positive terminal 52 of the DC power source. The base B of the transistor 40 is connected through a network 54 to the lower end of the winding 48. In like manner, the base B of transistor 42 is connected through a network 56 to the upper end of winding 48.

The transformer 44 is further provided with four secondary windings 60, 62, 64 and 66. Each is connected through a pulse shaping network N to the control input circuit of a different one of the controlled valves. More particularly, secondary 60 is connected through its associated pulsing network N1 and lines 70 to the gate and cathode electrodes of valve V1; secondary winding 62 is connected through its associated pulse network N3 and lines 72 to the control input circuit of valve V3; secondary 64 is connected through its associated pulsing circuit N4 and lines 74 to the control input circuit of valve V4; and secondary winding 66 is coupled through its associated pulsing network N2 and lines 76 to the control input circuit of valve V2.

The firing circuit 36 is self-oscillating. Transistors 40 and 42 are not absolutely identical in their leakage characteristics, and one or the other will commence to conduct more than the other. Assuming that transistor 40 has the greater leakage current, the leakage conduction will initiate a feedback potential to the base circuits which will cause the most conductive transistor 40 to become fully saturated and the other transistor 42 to be blocking. Transistor 40 continues to conduct until such time that the core of transformer 44 saturates. When this occurs, the flux will cease to increase and the transistor 42 will no longer be driven non-conductive. When this occurs flux in the core 44 will decrease in magnitude from the saturated value to the remanence value, inducing a voltage of opposite polarity in the winding 48. This will block transistor 40 and cause base drive current to flow in the transistor 42, initiating a regenerative action which rapidly saturates transistor 42, whereby current will flow into the primary winding 48 in the opposite direction until it drives the transformer core to saturation in the opposite direction. The firing circuit 32 will continue to oscillate as above described thereby inducing an alternating voltage in the secondary windings 60, 62, 64 and 66.

The voltages induced in the secondary windings are substantially rectangular in shape, and the pulsing networks N transform these square wave pulses into peaked pulses which are applied in proper polarity to the controlled valves V. During one half cycle of its oscillation, the firing circuit 36 will apply pulses to valves V1 and V2 rendering these valves conductive, and on the other half cycle pulses will be applied to valves V3 and V4 to render these valves conductive.

In considering the operation of the circuit of FIG. 2, assume that periodic alternations of the oscillator 36 define alternately recurring intervals arbitrarily designated as T1 and T2 respectively. Assume further that the gating circuit 36 applies gating pulses coincident with the beginning of the interval T1 to valves V1 and V2, and that gating pulses coincident with the beginning of interval T2 are applied to valves V3 and V4. Assume further that the apparatus is in the half cycle T1, and valves V1 and V2 are conducting while valves V3 and V4 are blocking. During this interval, condenser 30 is charged up with its lower end positive. At the beginning of period T2, the oscillator 36 applies firing pulses to valves V3 and V4, rendering these valves conductive. Condenser 30 starts to discharge from terminal 24 through bridge legs 12 and 16 to terminal 26, and through legs 18 and 14 to terminal 26. The discharge path through legs 12 and 16 is from terminal 24 through reactor X1, dividing between valve V1 in its reverse direction (until carriers are swept out) and a path including reactor Y1 and diode D1 in the forward direction, meeting again at terminal 20. From terminal 20, the discharge path continues through V3 in its forward direction and reactor X3 to terminal 26. The simultaneous discharge path through legs 18 and 14 may be traced from terminal 24 dividing through valve V4 in its forward direction and reactor X4 to terminal 22, thence through reactor X2, dividing through valve V2 in its reverse direction and the path including reactor Y2 and diode D2 in its forward direction, and meeting again at terminal 26.

While these discharge paths exist for this polarity of condenser discharge, their initial impedance is high due to the saturable reactors. For example, the flow path from terminal 24 to terminal 26 through legs 12 and 16, includes reactors X1, Y1 and X3. The cores of these reactors had been reset during the previous half cycle. The high initial impedances of these reactors provide a number of useful results. A safe value of reverse voltage is applied across valve V1. The time for capacitor 30 to discharge is increased, thereby increasing the time permitted for the controlled valve V1 to recover. The maximum capacitor discharge current is reduced. The latter can be reduced even more if the reactor Y1 is designed to absorb more volt-seconds than the reactor X1. Momentarily and before turn-off of valves V1 and V2 is effected, all four valves will be conducting. However, any sudden current rises are generally choked by reactor 35. Turn-off of valve V1 is completed when the valve is fully recovered. Valve V1 is protected from forward polarity voltage spikes which generally occur during the forepart of its blocking half cycle. These spikes which are due to the energy stored in reactor 35 and possibly in the inductance of the connecting conductors of the circuit, or even in the internal capacitance of the device itself, are effectively absorbed by reactor X1.

After the condenser has discharged, diode D1 is subjected to the full line voltage in the reverse direction plus voltage absorbed in the reactor 35. However, reactor Y1 holds off this reverse voltage for the time required for the carriers in the diode D1 to recombine thereby permitting the diode to recover and be capable of blocking the DC voltage along with the adjacent controlled valve V1. Of course, after the condenser has discharged, it begins to charge up in the opposite polarity during the balance of interval T2. At first it may appear that the cores of reactors Y will not reset (i.e., go alternately from positive saturation, to negative saturation to positive saturation, etc.). However, it was found that the reverse current through the diodes D due to recombination of carriers immediately following forward conduction is sufficient to reset the cores.

In the meantime when valve V3 had been turned on, reactor X3 for the short interval before its saturation limits the initial "dose" of load current through valve V3 for enough time to allow the current carrying area to defuse or spread through the entire current carrying junction making the valve V3 capable of handling greater power.

Duplicate effects are obtained during interval T2 in the parallel discharge path from terminal 24 to terminal 26 through legs 18 and 14, i.e., the action through legs 14 and 18 is the same as and concurrent with the action in legs 12 and 16.

The respective reactors X and Y need to absorb only the necessary volt-seconds before they saturate to protect the devices depending on such protection. For example, reactor X needs to absorb only the necessary volt-seconds to protect the valve against the forward voltage spikes during the forepart of the interval when the valve should be blocking. On the other hand, the reactor Y, which for protection of diode D is in series with reactor X, needs to absorb only the volt-seconds necessary to hold off reverse voltage on diode D until it reforms. Thus the respective reactors may be designed to saturate at substantially the end of time periods equal to the turn-off or recovery periods of the respective devices protected by the reactors.

Since current and voltage values and directions are substantially the same in the same sections of opposite legs of the bridge, the reactors X in opposite legs may be combined on a common core. This is also true of reactors Y in opposite legs. Thus, reactors Y1 and Y2 may be combined on a common core, and reactors X1 and X2 may be likewise combined on a common core. The same holds true for reactors Y3 and Y4 and for reactors X3 and X4.

The inverter illustrated in FIG. 4 is similar to that in FIG. 2 except that the respective reactor windings in each leg of the bridge are inductively coupled on a single core to provide transformer action in addition to the reactor functions obtained in the circuit of FIG. 2. In the circuit of FIG. 4, each leg includes a controlled valve V in series with the primary winding P of a transformer T whose secondary winding S is in series with an oppositely poled diode D in a shunt circuit connected across the valve.

While there is also transformer coupling between the primary and secondary windings P and S of each transformer T, each of the windings P and S in combination with the saturable transformer core K forms a saturable reactor. Thus, the combination of the core K and primary winding P is a saturable reactor in series with the controlled valve V in the associated leg of the bridge. For example, in leg 12, the primary P1 and core K1 form a reactor in series with the controlled valve V1. Likewise, the combination of the core K and the secondary winding S is a saturable reactor in series with the diode D in the shunt circuit across the valve V. For example in leg 12, core K1 and secondary S1 form a reactor in series with diode D1 in the shunt circuit across valve V1.

The windings P and S perform the same functions as reactors X and Y respectively of FIG. 2. Additionally due to the transformer action an increased reverse potential is obtained across the controlled valve which helps to speed up the turn-off process and provide a reliable turn-off mechanism.

In summary, it is seen that the invention provides an inverter circuit wherein a safe value of reverse voltage is applied across the valve being turned off, forward voltage spikes during and immediately after commutation and turn-off are effectively absorbed, the time for discharging the commutating capacitor is increased thus increasing the time permitted for recovery of the controlled valves, the maximum capacitor discharge current is reduced, and the maximum load current at the controlled valves is increased. Also the circuit is less wasteful of power and less sensitive to load variations. Thus, the various facets of the invention cooperate to provide a substantially improved DC-AC inverter.

It is to be understood that the herein described arrangements are simply illustrative of the principles of the invention, and that other embodiments and applications are within the spirit and scope of the invention.

I claim as my invention:

1. In a current converter having an input circuit and an output circuit coupled to the input circuit through first and second alternately conductive current paths, each path having in series therewith a controllable electric valve, and which includes commutating capacitor means coupled to said valves for applying a reverse voltage across one valve in response to turn-on of the other valve, the combination therewith of first and second saturating reactors each in a different one of said paths, a circuit connected across one of said valves and including a third saturating reactor in series with an asymmetric device poled opposite to said one valve, and a circuit connected across the other valve and including a fourth saturating reactor in series with a second asymmetric device poled opposite to said other valve.

2. In a DC-AC inverter having first and second alternately gated controlled valves for periodically reversing connections between a DC source and an AC output circuit, and which includes commutating capacitor means whose charge condition is periodically affected in response to the respective alternating conduction periods of said valves, and wherein said capacitor means applies a reverse voltage across one valve in response to turn-on of the other valve, the combination therewith of first and second saturating reactors each in series with a different one of said valves, a circuit connected across one of said valves and including a third saturating reactor in series with an asymmetric device poled opposite to said one valve, and a circuit connected across the other valve and including a fourth saturating reactor in series with a second asymmetric device poled opposite to said other valve.

3. In a DC-AC inverter having first and second alternately gated controlled valves for periodically reversing connections between a DC source and an AC output circuit, and wherein a commutating capacitor is periodically charged in opposite polarities in response to the respective alternating conduction periods of said valves, and wherein said capacitor applies a reverse voltage across one valve in response to turn-on of the other valve, the combination therewith of a first winding in series with the first valve, a second winding in series with the second valve, a circuit connected across the first valve and including a third winding in series with an asymmetric device poled opposite to the first valve, a circuit connected across the second valve and including a fourth winding in series with a second asymmetric device poled opposite to the second valve, a first saturating core on which said first and third windings are inductively coupled, and a second saturating core on which said second and fourth windings are inductively coupled.

4. In a DC-AC inverter having first and second alternately gated solid state controlled valves for periodically reversing connections between a DC source and an AC output circuit, and wherein commutating capacitor means is periodically charged in opposite polarity in response to the respective alternating conduction periods of said valves, and wherein said capacitor means applies a reverse voltage across one valve in response to turn-on of the other valve, the combination therewith of first and second saturable reactors each in series with a different one of said valves, a circuit connected across one of said valves and including a third saturable reactor in series with a solid state asymmetric device poled opposite to said one valve, and a circuit connected across the other valve and including a fourth saturable reactor in series with a second solid state asymmetric device poled opposite to said other valve.

5. In a DC-AC inverter having first and second alternately gated controlled valves for periodically reversing the connections between a DC source and an AC output circuit, and wherein a commutating capacitor is periodically charged in opposite polarity in response to the respective alternating conduction periods of said valves, and wherein said capacitor applies a reverse voltage across one valve in response to turn-on of the other valve, and wherein there is non-saturating inductive reactor means in series with said valves, the combination therewith of first and second saturating reactors each in series with a different one of said valves, a circuit connected across one of said valves and including a third saturating reactor in series with an asymmetric device poled opposite to said one valve, and a circuit connected across the other valve and including a fourth saturating reactor in series with a second asymmetric device poled opposite to said other valve.

6. In a DC-AC inverter having a pair of D.C. input lines for connection to a DC source and a pair of output terminals for connection to an AC load, and wherein said DC lines are connected to the AC terminals through alternately conductive first and second current paths whereby the connections from the DC lines to the AC terminals are periodically reversed, each path including in series therein a controllable electric valve, and the AC output terminals having thereacross a commutating capacitor, the combination therewith of first and second saturating reactors each in series in a different one of said paths, a circuit connected across one of said valves and including a third saturating reactor in series with an asymmetric device poled opposite to said one valve, and a circuit connected across the other valve and including a fourth saturating reactor in series with a second asymmetric device poled opposite to said other valve.

7. The combination of claim 6 wherein said valves are solid state controlled valves and said asymmetric devices are solid state asymmetric devices.

8. In a DC-AC inverter system which includes first and second alternately conductive current paths connecting DC input terminals to an AC output circuit for supplying power to said output circuit in alternating polarity, each of said current paths having a controlled electric valve having a forward direction in which it conducts in response to a gating signal, means rendering said valves alternately conductive to pass current through said output circuit in opposite directions, non-saturating inductive reactor means in series with said current paths, and which system further includes commutating capacitor means which is alternately charged in opposite polarities by the alternating conductions of said paths, and which capacitor means applies a reverse voltage across one valve to turn it off when the other valve is gated on, the combination therewith of first and second saturable reactors, each in series with a different one of said valves, a shunt circuit connected across one of said valves including a third saturable reactor and an asymmetric device oppositely poled relative to the forward direction of that valve, and a second shunt circuit connected across the other valve and including a fourth saturable reactor and an asymmetric device poled opposite to the forward direction of the valve it shunts.

9. In a DC-AC inverter comprising DC input terminals for connection to a DC source, an AC output circuit, a pair of solid state controlled valves each having a forward direction in which it is rendered conductive in response to a gating signal, said valves being connected to provide alternate paths from said DC terminals to said AC circuit in respectively opposite directions, means for alternately applying gating signals to the respective valves, whereby the valves are alternately gated, and condenser means chargeable in opposite directions in response to respective alternate conduction of said valves and which in response to turn-on of one valve applies a reverse voltage across the other valve, the combination therewith of first and second saturable reactors each in series with a different one of said valves, a shunt circuit connected across one of said valves and including a third saturable reactor in series with a solid state asymmetric device poled opposite to the valve it shunts, and a shunt circuit connected across the other valve and including a fourth saturable reactor in series with a solid state asymmetric device poled opposite to the valve which it shunts.

10. In a DC-AC inverter having a DC input circuit and an AC output circuit, and wherein alternately conductive current paths are coupled from a common DC terminal in the input circuit to opposite sides of the AC circuit, each of said current paths including a control valve having a forward direction in which the valve conducts in response to a gating signal applied to the valve, and wherein there are means for alternately gating said valves, and which inverter further includes commutating condenser means connected across said AC output circuit, the combination therewith of first and second saturating reactors each in series with a different one of said current paths, a circuit connected across one of said valves and including a third saturating reactor in series with an asymmetric device poled opposite to said one valve, and a circuit connected across the other valve and including a fourth saturating reactor in series with a second asymmetric device poled opposite to said other valve.

11. In a DC-AC converter having a DC input circuit and an AC output circuit, and wherein alternately conductive current paths are coupled from a common DC terminal in the input circuit to opposite sides of the AC circuit, each of said current paths including solid state control valve having a forward direction in which the valve conducts in response to a gating signal applied to the valve, and wherein there are means for alternately gating said valves, and which inverter further includes a commutating condenser connected across said AC output circuit, the combination therewith of first and second saturable reactors each in series with a different one of said current paths, third and fourth saturable reactors, and first and second shunt circuits each connected across a different one of said valves, each shunt circuit including a different one of said third and fourth saturable reactors and a solid state assymetric device poled opposite to the forward direction of the valve it shunts.

12. In a DC-AC inverter having a DC input circuit, and an AC output circuit, and wherein alternately conductive current paths are coupled from a common DC terminal in the input circuit to opposite sides of the AC circuit, each of said current paths including a control valve having a forward direction in which the valve conducts in response to a gating signal applied to the valve, and wherein there are means for alternately gating said valves, and which inverter further includes a commutating condenser connected across said AC output circuit, the combination therewith of first and second saturable reactors each in series with a different one of said current paths, third and fourth saturable reactors, and first and second shunt circuits each connected across a different one of said valves, each shunt circuit including a different one of said third and fourth saturable reactors and an asymmetric device poled opposite to the forward direction of the valve it shunts, the series reactor and the shunt reactor associated with each valve being inductively coupled to each other.

13. The combination of claim 12 wherein said valves are solid state controlled valves and said asymmetric devices are solid state asymmetric devices.

14. A bridge type parallel DC-AC inverter comprising a pair of DC input lines, a pair of AC output lines, a plurality of controlled electric valves, a four-legged bridge having one pair of opposite corners coupled to said DC input lines and the other pair of opposite corners coupled to said AC output lines, a plurality of saturable first reactors each of said legs including in series a different one of said first reactors and the main current path of a different one of said controlled valves, each of said valves having a forward direction in which it is rendered conductive in response to a gating signal, all of said valves being poled alike relative to said DC input lines, whereby said valves are conventionally poled to provide the inverter function, those of said valves connected in one set of opposite legs of the bridge being referred to as a first valve pair and the other two valves in the other set of opposite legs of the bridge being referred to as a second valve pair, means for alternately gating said first and second valve pairs whereby said bridge acts as a periodically reversing switch between said DC and AC lines, a plurality of saturable second reactors, and a plurality of shunt circuits each connected across a different one of said valves and each including an asymmetric device and a different one of said second reactors in series with the device, each of said asymmetric devices being poled opposite to the forward direction of the valve it shunts.

15. The combination of claim 14 wherein said valves are solid state controlled valves and said asymmetric devices are solid state asymmetric devices.

16. A bridge type parallel DC-AC inverter comprising a pair of DC input lines, a pair of AC output lines, a plurality of controlled electric valves, a four-legged bridge having one pair of opposite corners coupled to said DC input lines and the other pair of opposite corners coupled to said AC output lines, a plurality of saturable first reactors, each of said legs including in series a different one of said first reactors and the main current path of a different one of said controlled valves, each of said valves having a forward direction in which it is rendered conductive in response to a gating signal, all of said valves being poled alike relative to said DC input lines, whereby said valves are conventionally poled to provide the inverter function, those of said valves connected in one set of opposite legs of the bridge being referred to as a first valve pair and the other two valves in the other set of opposite legs of the bridge being referred to as a second valve pair, means for alternately gating said first and second valve pairs whereby said bridge acts as a periodically reversing switch between said DC and AC lines, a plurality of saturable second reactors, and a plurality of shunt circuits each connected across a different one of said valves and each including an asymmetric device and a different one of said second reactors in series with the device, each of said asymmetric devices being poled opposite to the forward direction of the valve it shunts, said series and shunt reactors associated with each of said valves being inductively coupled on a common core.

17. In a DC-AC inverter wherein there are first and second DC input terminals, and a plurality of AC output terminals, and wherein there are a plurality of controlled electric valves, and a plurality of controllable current paths each path having in series therein a different one of said valves, and wherein there is connected between each DC terminal and each AC terminal a different one of said current paths, and wherein all said valves are poled alike relative to said DC terminals, the combination therewith of a plurality of saturating first reactors each connected in a different one of said paths whereby each valve is in series with a different one of said first reactors, a plurality of asymmetric devices, a plurality of saturating second reactors, and a plurality of shunt circuits each connected across a different one of said valves, each shunt circuit including a different one of said second reactors in series with a different one of said asymmetric devices.

18. The combination of claim 17 wherein said valves are solid state controlled valves and said asymmetric devices are solid state asymmetric devices.

19. In a bridge type DC to AC inverter wherein there are first and second DC input terminals, a plurality of AC output terminals, and a plurality of controlled electric valves, and wherein there is a plurality of pairs of bridge legs each pair being associated with a different one of said AC terminals, each leg of a pair being connected between the associated AC terminal and a different one of the DC terminals, each leg including in series therein a different one of said valves, and all said valves being poled alike with respect to said DC terminals, the combination therewith of a plurality of saturating first reactors each connected in a different one of said legs whereby each valve is in series with a different one of said first reactors, a plurality of asymmetric devices and a plurality of saturating second reactors arranged in a plurality of shunt circuits each connected across a different one of said valves, each of said shunt circuits including a different one of said second reactors in series with a different one of said asymmetric devices, the asymmetric device in each shunt circuit being poled opposite to the valve shunted by that circuit.

20. The combination of claim 19 wherein said valves are solid state controlled valves and said asymmetric devices are solid state asymmetric devices.

References Cited

UNITED STATES PATENTS

| | | | |
|---|---|---|---|
| 3,074,030 | 1/1963 | Hierholzer | 321—45 X |
| 3,082,369 | 3/1963 | Landis. | |
| 3,085,190 | 4/1963 | Kearns et al. | 321—45 |
| 3,257,604 | 6/1966 | Colclaser et al. | 321—45 |

JOHN F. COUCH, *Primary Examiner.*

W. SHOOP, *Assistant Examiner.*